United States Patent [19]
Rybarczyk et al.

[11] Patent Number: 6,041,178
[45] Date of Patent: *Mar. 21, 2000

[54] GRAPHICAL TOOL FOR CREATING DISCRETE PHASE SEQUENCES AND DEVICE CONTROL

[75] Inventors: David F. Rybarczyk; Lori S. Mar; Christiaan M.H. Mets, all of Phoenix, Ariz.; Xiaojin Xi, Austin, Tex.

[73] Assignee: Honeywell Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,746

[22] Filed: Oct. 4, 1996

[51] Int. Cl.[7] ............................... G06F 17/00; G06F 9/00
[52] U.S. Cl. ........................ 395/705; 395/701; 345/965; 345/967; 345/326; 364/136; 364/146; 364/191; 364/192
[58] Field of Search .................................. 395/705, 707, 395/708, 500; 345/970, 965, 961, 326, 333, 156, 168, 524; 364/146, 136, 141, 130, 147, 191, 192, 194

[56] References Cited

U.S. PATENT DOCUMENTS

| | | | |
|---|---|---|---|
| 4,797,854 | 1/1989 | Nakazaki et al. | 364/900 |
| 4,852,047 | 7/1989 | Lavallee et al. | 364/191 |
| 5,247,693 | 9/1993 | Bristol | 395/705 |
| 5,291,391 | 3/1994 | Mead et al. | 364/148 |
| 5,325,534 | 6/1994 | Galy et al. | 395/500 |
| 5,371,895 | 12/1994 | Bristol | 395/705 |
| 5,450,346 | 9/1995 | Krummen et al. | 364/468.24 |
| 5,485,620 | 1/1996 | Sadre et al. | 395/710 |
| 5,499,188 | 3/1996 | Kline, Jr. et al. | 364/468.13 |
| 5,576,946 | 11/1996 | Bender et al. | 364/146 |

OTHER PUBLICATIONS

Honeywell brochure, "Batch Supervisor Series", SL-53-419 (5M) Jan. 1995, including description of Batch Supervisor Model 45 on p. 4.

Honeywell brochure, "Soar to Superior Performance With the TotalPlant Solution System", SL-53-496 (10M) Oct. 1998, describing the TotalPlant Solution System (formerly known as the TDC-3000 controller).

Honeywell brochure, "Honeywell TotalPlant Batch", SL-53-510 Rev (5M) Jun. 1997, describing the TotalPlant Batch (TPB).

An article by P.S. Fruehauf, entitled Graphical Techniques for Preparing Functional Descriptions for Batch Control System Projects, vol. 45, NR. Part 01, pp. 31–47). (Jan. 1, 1990).

An article by D. Troy et al., entitled A Development Environment for Batch Process Control, Computer in Industry, vol. 31, NR. 1, pp. 61–84 (Oct. 30, 1996).

An article by M. Van Bergeijk, entitled Advanced Batch Control System Software Simplifies Automation Projects, Journal A, vol. 33, NR. 1, pp. 65–69 (Mar. 1, 1992).

An article by J. Love et al., entitled Sequence Synthesis for Batch Process Control, Journal A., vol. 33, NR. 1, pp. 42–51 (Mar. 1, 1992).

An article by N. Gutmanovitcz, entitled Batch Sequence Automation Via MMI Recipe Screen, Advances in Instrumentation and Control, vol. 50, NR. Part 03, pp. 1187–1194 (Oct. 1, 1995).

An article by B. Nelson, entitled New Technology Trends Simplify Batch Control, 1 & CS—Industrial and Process Control Magazine, vol. 69, NR. 7, pp. 43–46 (Jul. 1, 1996).

*Primary Examiner*—Tariq R. Hafiz
*Assistant Examiner*—Tuan Q. Dam
*Attorney, Agent, or Firm*—Ohlandt, Greeley, Ruggiero & Perle

[57] ABSTRACT

A system which comprises: a graphical tool which is capable of building discrete phase sequential steps and a smart device control for input/output device control; a microprocessor which is capable of running the phase sequential steps; and a I/O communication processor which is capable of communicating the phase sequential steps to the input/output device.

21 Claims, 10 Drawing Sheets

GRAPHICAL TOOL FOR CREATING DISCRETE PHASE SEQUENCES AND DEVICE CONTROL

The present invention generally relates to a graphical tool which is particularly useful for building batch or phase sequential steps (i.e., controller codes) and for input/output (I/O) device control via a unique smart device control (SDC). The SDC functions in communication with the phase sequential steps created by the unique graphical tool of the present invention by providing for the following: (1) device request and activation; (2) device mode propagation; (3) device safe state enable/disable; and (4) device fail enable/disable

BACKGROUND OF THE INVENTION

The conventional method for engineering or creating batch phase sequential steps (e.g., a dose phase requires the following sequential steps to cause a device to perform a specific dosing function: (1) open valve, (2) pump product, and (3) heat product) required operators to piece the code together from a text editor on, for example, a TDC-3000 Universal Station sold by Honeywell Inc. This is extremely time consuming and prone to errors.

The unique Windows® (a trademark of Microsoft Corporation) based graphical tool for engineering phase or batch sequential steps (i.e., controller codes) and device control is capable of reducing the development time for projects doing batch control. The primary advantages for using the graphical tool of the present invention are as follows: (1) ease of use; (2) unique version of controller code (CL code) which runs on batch controllers such as Honeywell's TDC-3000 controllers; (3) supports interfaces to batch products such as Honeywell's BS M45 and Total Plant Batch (TPB); (4) supports the association of devices to sequences via a "state-request" interface which allows for a more flexible device control strategy than has previously been supported; (5) supports "smart device" functions in communicating with phases including device mode propagation, device safe state enable/disable and device fail enable/disable; and (6) flexible "insertion points" which allows the user to include custom CL code. These insertions come in various types, i.e., Type 1: code is fully developed and user just inserts as needed, and Type 2: code "shell" is included which user then modifies.

The present invention also provides many additional advantages which shall become apparent as described below.

SUMMARY OF THE INVENTION

A system which comprises: a graphical tool which is capable of building batch or phase sequential steps and a smart device control for input/output device control; a microprocessor which is capable of running the phase sequential steps; and an input/output (I/O) communications processor which is capable of communicating the inputs and outputs of the phase sequential steps to the input/output devices. This unique graphical tool is capable of creating objects (e.g., phases, smart device control codes, etc.).

In particular, the system preferably comprises: a means for creating or opening a project; a means for generating at least one code or adding or editing a phase, the smart device control, a box, or an equipment list; a means for adding or editing header data; a means for adding or editing either a normal step; a branch step or a message step, a means for detecting whether any new inputs have been received from the device; a means for sending outputs to the devices; and a means for closing the project.

Additionally, a controller compiler/loader is disposed between the graphical tool and the microprocessor and I/O communication processor. The controller compiler/loader preferably comprises: a controller code compiler for compiling the phase sequential steps; a means for generating object files based upon the phase sequential steps; and a means for loading the object file into run time.

The phase control code communicates with the smart device control code and the smart device control communicates with the I/O communication processor for the purpose of activating or deactivating the input/output device.

The present invention also includes a storage media for controlling a processor such that the processor is capable of using the novel graphical tool of the present invention to build batch or phase sequential steps and smart device control codes for input/output device control.

Furthermore, the present invention also includes a process which comprises the step of using a graphical tool which is capable of building batch or phase sequential steps and a smart device control for input/output device control. More specifically, the process comprises the following steps: creating or opening a project; generating at least one code, or adding or editing a phase, the smart device control, a box, or an equipment list; adding or editing header data; adding or editing either a normal step, a branch step or a message step; detecting whether any new inputs have been received from the device; sending outputs to the device; and closing the project.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
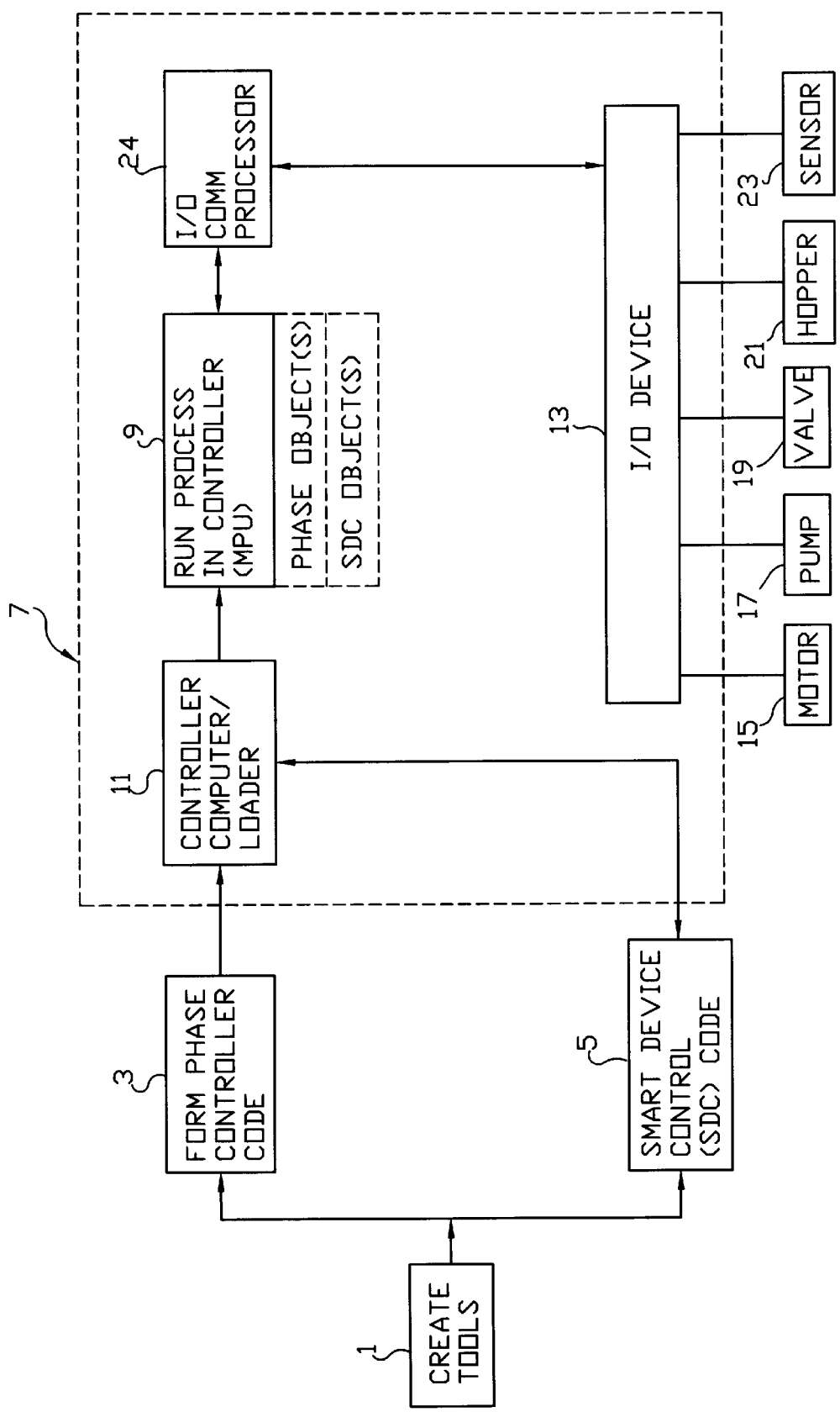
FIG. 1 is a block diagram of phase program according to the present invention wherein the graphical tool is capable of building the phase sequential steps and controlling the devices via a smart device control (SDC)

The present invention can best be understood by referring to the attached drawings, wherein FIG. 1 is a block diagram of the phase program according to the present invention. The phase program operates as a single unit and is a collection of discrete steps to comprise a phase sequence. A phase sequence is a low level procedural element responsible for a discrete unit task (e.g., dose, agitate, heat). A batch unit recipe is a collection of phase sequences which collectively control a process unit (e.g., reactor, dryer, etc.). Each phase is created in a graphical format by means of a program such as Phase Builder sold by Honeywell Inc. The graphical sequences created in step 1 are then transformed into controller codes 3 for the purpose of building phase sequential steps (e.g., open, valve, pump, heat) and smart device control 5. Thereafter, the phase sequential steps formed in controller code 3 are sent to a controller box 7, wherein the controller codes are processed via controller compiler/loader 11 and a microprocessor (MPU) 9 which converts the CL and SDC codes from steps 3 and 5, respectively, into phase objects and SDC objects, respectively, before being forwarded to I/O communication processor 24 for transmission to I/O device 13. Smart device control 5 is capable of communicating with I/O communication processor 24 in the following ways: (1) device activation, (2) device mode propagation, (3) device safe state enable/disable, and (4) device fail enable/disable. Simply put, SDC 5 allows I/O device 13 to be activated or deactivated. When I/O device 13 is activated it electronically communicates with various devices such as motor 15, pump 17, valve 19, hopper 21 and sensor 23, wherein the controller codes instruct such devices to perform in accordance with the phase sequential steps formed in controller code 3.

Figure 2:
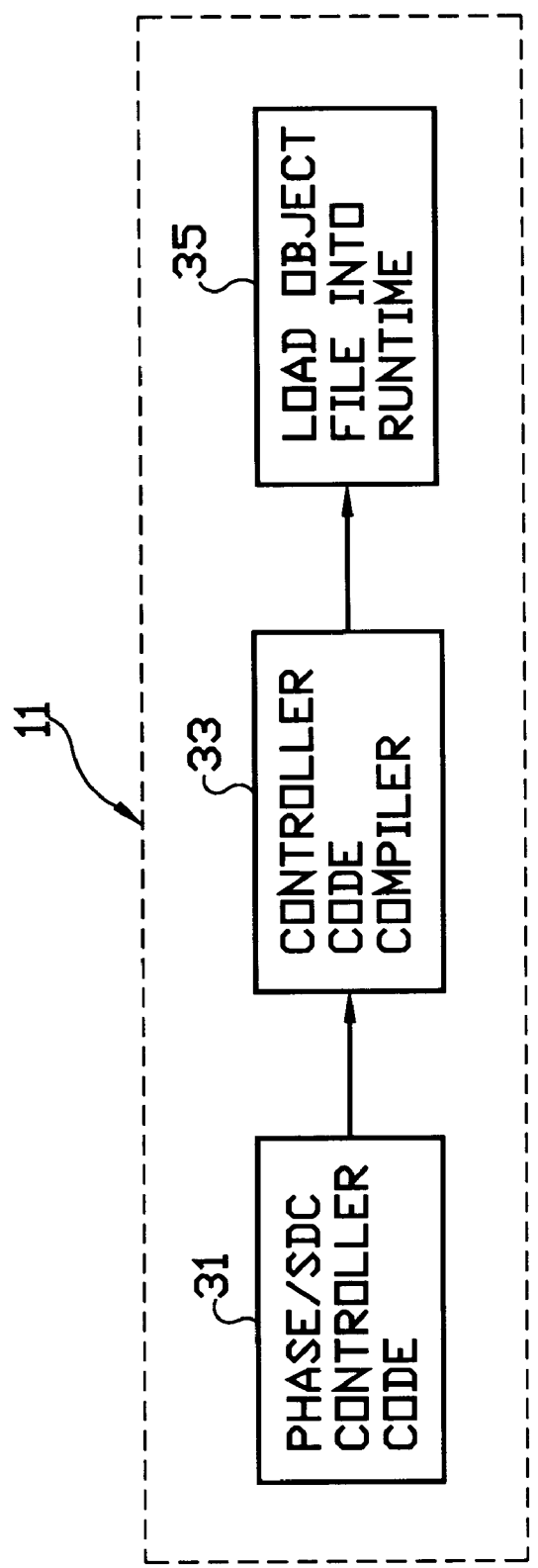
FIG. 2 is a block diagram of a controller code compiler/loader which comprises a controller code compiler, a means for generating an object file and a means for loading an object file into run time.

Controller code compiler/loader 11, as shown in FIG. 2, comprises a phase/SDC controller code 31 which stores the controller codes (i.e., the phase sequential steps and SDC codes) formed in controller code step 3 via the graphical tools used in step 1. Thereafter, the codes are forwarded to a controller code compiler 33 which is capable of generating object files from such CL and SDC codes. The object files are then loaded into run time 35 before being used to instruct I/O device 13 what sequential steps are to be taken during the particular phase.

Figure 3A:
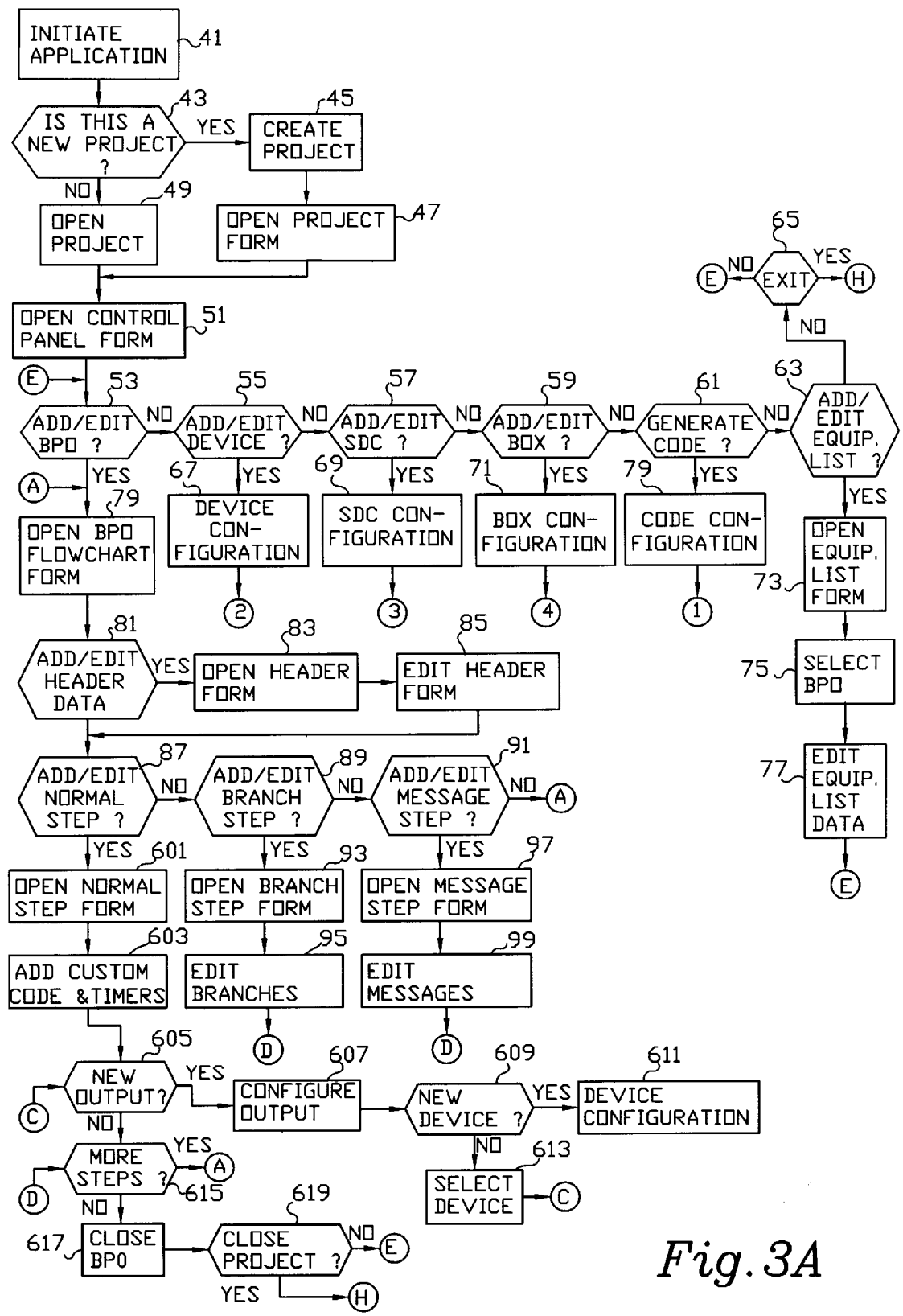
FIGS. 3A–3G is the operational flowchart of the phase or batch controller which is capable of executing phase sequential steps and controlling the I/O devices of the batch process.
Figure 3B:
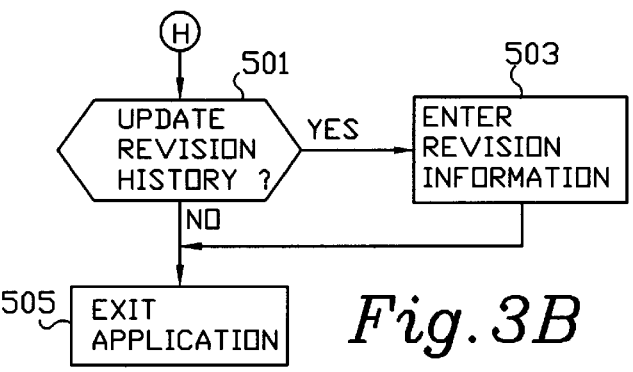

The batch process operation according to the present invention wherein a tool is used to build phase sequential steps can best be understood by referring to the logic diagrams set forth in FIGS. 3A–G, attached hereto. FIG. 3A has the following steps wherein the application is initiated 41. If a new project 43 is to be created then steps 45 and 47 are undertaken wherein a project form is opened 47. If an exiting project is to be undertaken, then the project is opened 49. Once a new or exiting project is opened then the control panel form is opened 51. Thereafter, the application seeks to determine whether the phase or basic process operation (BPO) is to be added to or edited 53. If the phase is not to added to or edited, then the application seeks to determine if any of the following are to added to or edited: device 55, smart device control (SDC) 57, box 59, and equipment list 63, it can also seek to generate a code 61 or exit the application 65.

Figure 3C:
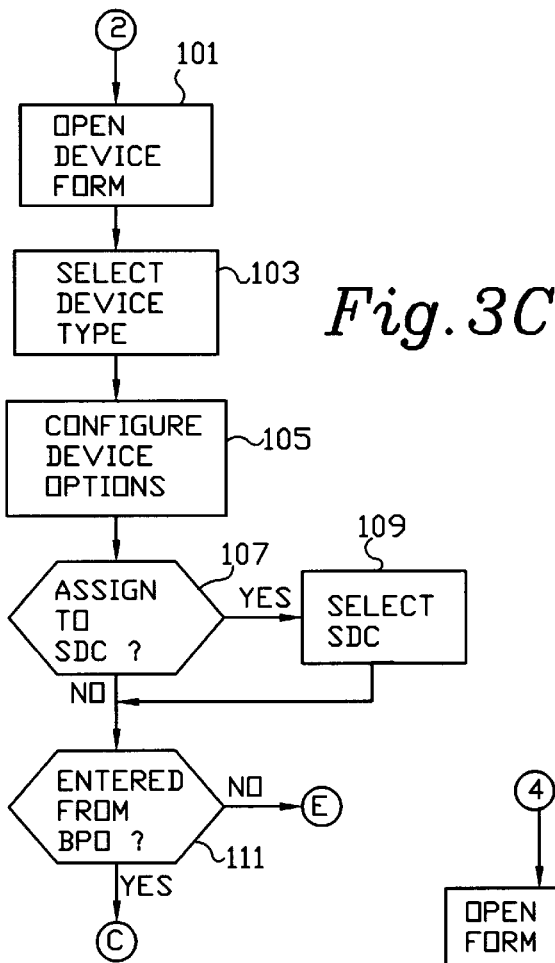

If the user seeks to add or edit a device 55, then the device is configured 67 in accordance with FIG. 3C wherein a device form is opened 101, the device type is selected 103 and the device options are configured 105. The application then inquires as to whether or not the device is assigned to SDC 107. If assigned to SDC, then the SDC is selected 109. If not assigned, then the application inquires as to whether the device was entered from phase 111. If the device was entered from the phase, then go to step 'C' in FIG. 3A. If the device is not entered from the phase, then go to step 'E" in FIG. 3A.

Figure 3D:
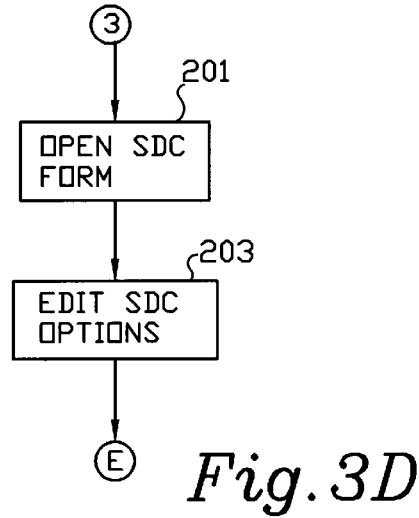

If the user seeks to add or edit a smart device control 57, then the SDC is configured 69 in accordance with FIG. 3D wherein an SDC form is opened 201 and then the SDC options are edited 203. After the SDC options are edited the application then goes to step 'E' in FIG. 3A.

Figure 3E:
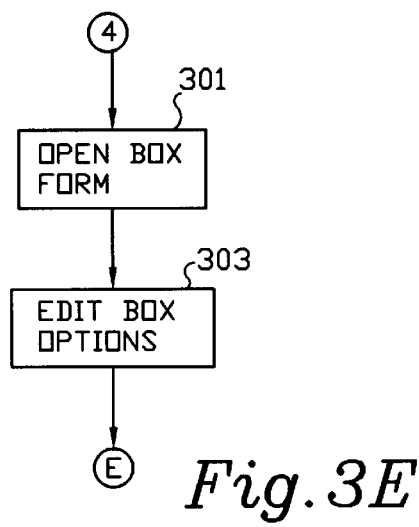

If the user seeks to add or edit a box 59, then the device is configured 71 in accordance with FIG. 3E wherein a box form is opened 301 and the box options are edited 303. After the box options are edited the application then goes to step 'E' in FIG. 3A.

If the user seeks to add or edit an equipment list 63, then the equipment list form is opened 73, the phase is selected 75 and the equipment list data is edited 77.

Figure 3F:
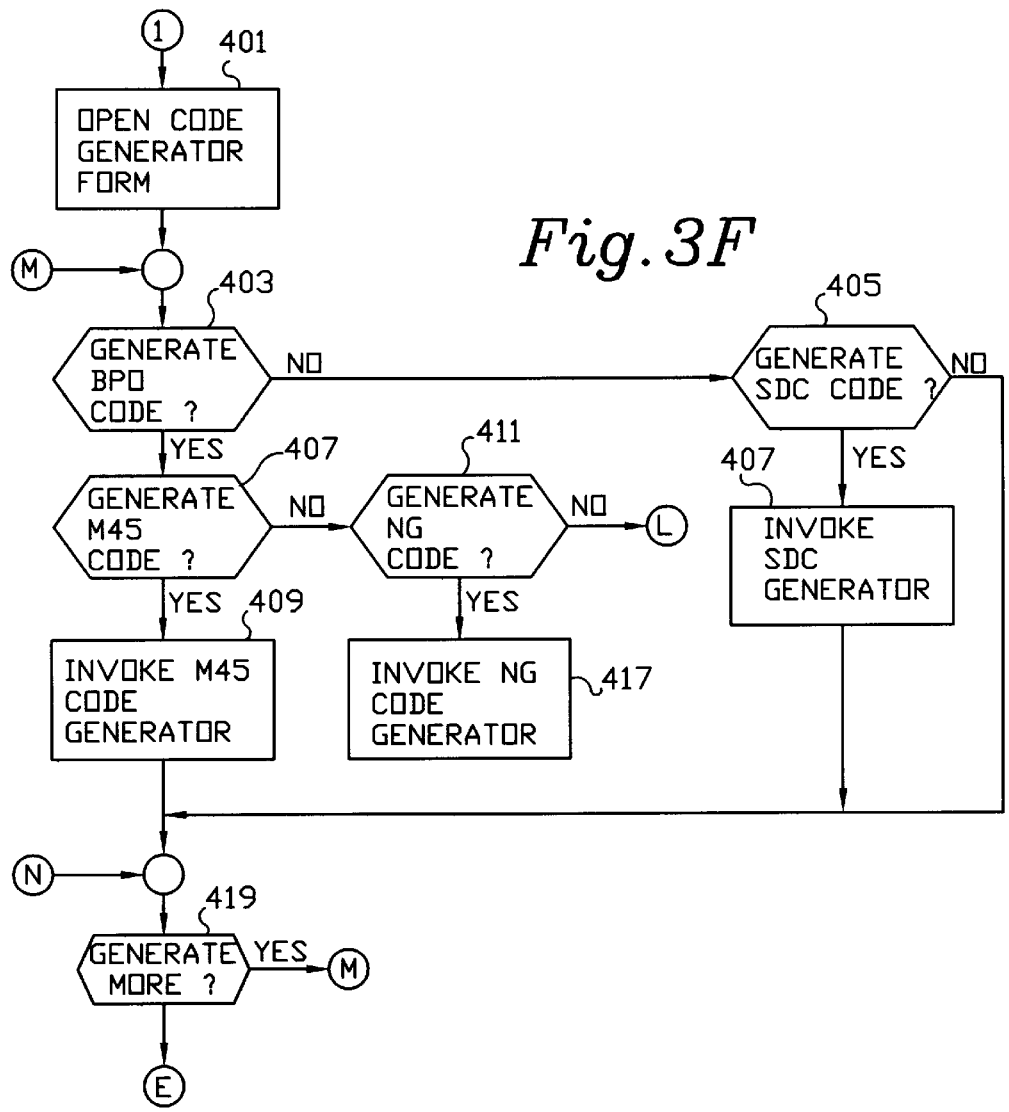
Figure 3G:
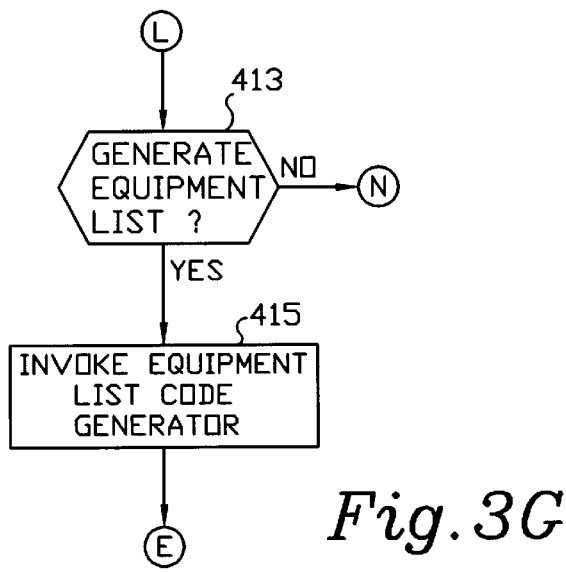

If the user seeks to generate a code 61, then the code generation step 79 is initiated and the code generator form is opened 401 in accordance with FIG. 3F. After the code generator form is opened, the application seeks to determine whether or not to generate a phase code 403. If the application does not seek to generate a phase code, it seeks to determine whether or not to generate a SDC code 405. If a SDC code is desired, then the application invokes the SDC generator 407. On the other hand, if a phase code is desired, the user seeks to determine whether or not to generate a M45 code 409. If so, the application invokes the M45 code generator 409. If not, the application seeks to determine if a total plant batch (TPB) or next generation (NG) code is desired 411. If no TPB code is desired the application goes to step 'L' in FIG. 3G, wherein the application seeks to determine if generation of an equipment list 413 is desired. If not, the application goes to step 'N' in FIG. 3F. If so, the application invokes an equipment list code generator 415 before returning to step 'N' in FIG. 3F.

If the user desires to generate a TPB code, it invokes a TPB code generator 417. After the application has generated either a M45 code, TPB code or SDC, it then determines whether or not the application needs to generate more codes or SDC 419. If more codes are desired, the application returns to step 'M' at the beginning of FIG. 3F. If no more codes are desired, the application returns to step 'E' of FIG. 3A.

Returning to FIG. 3A, if the application is not instructed to add/edit or generate a code, it seeks to determine whether or not to exit 65, i.e., close the application. If no, it returns to step 'E' in FIG. 3A. If it does wish to exit, then it goes to step 'H' wherein it seeks whether or not it is desirable to update the revision history 401. If revision of the history is desired, then the revision information is entered 503. Thereafter, the application is exited 505.

If the user adds or edits the phase, the phase flowchart form is opened 79 and the user determines whether or not it is desired to add or edit the header data 81. If so, the header form is opened 83 and the header form is edited 85. Thereafter, the user determines whether or not it is desired to add/edit the normal step 87, the branch step 89 or message step 91. If no add/edit step is requested at this time, the application goes to step A.

If it is desired to add/edit the branch step 89, then the branch step form is opened 93 and the branches are edited 95 before going to step 'D'. Similarly, if it is desired to add/edit the message step 91, the message step form is opened 97 and the messages are edited 99. Once the messages are edited it returns to step 'D'.

If the user desires to add/edit the normal step 87, then the normal step form is opened 601 and the custom code and timers are added 603. Thereafter, the application seeks to determine if new outputs are received 605. If so, the outputs are configured 607 and the application seeks to determine whether the outputs are coming from new devices 609. If new devices are detected, then the devices are configured 611. If the new outputs are being generated from an existing device, then the application selects the device 613. If no new outputs are detected, the application determines whether more steps 615 are desired. If so, the application returns to step 'A' in FIG. 3A. If no more steps are desired the phase is closed 617. The application then seeks to determine whether the operator would like to close the project 619. If not, the application returns to step 'E' of FIG. 3A. If the operator desires to close the project, then the application returns to step 'H' of FIG. 3B.

Figure 4:
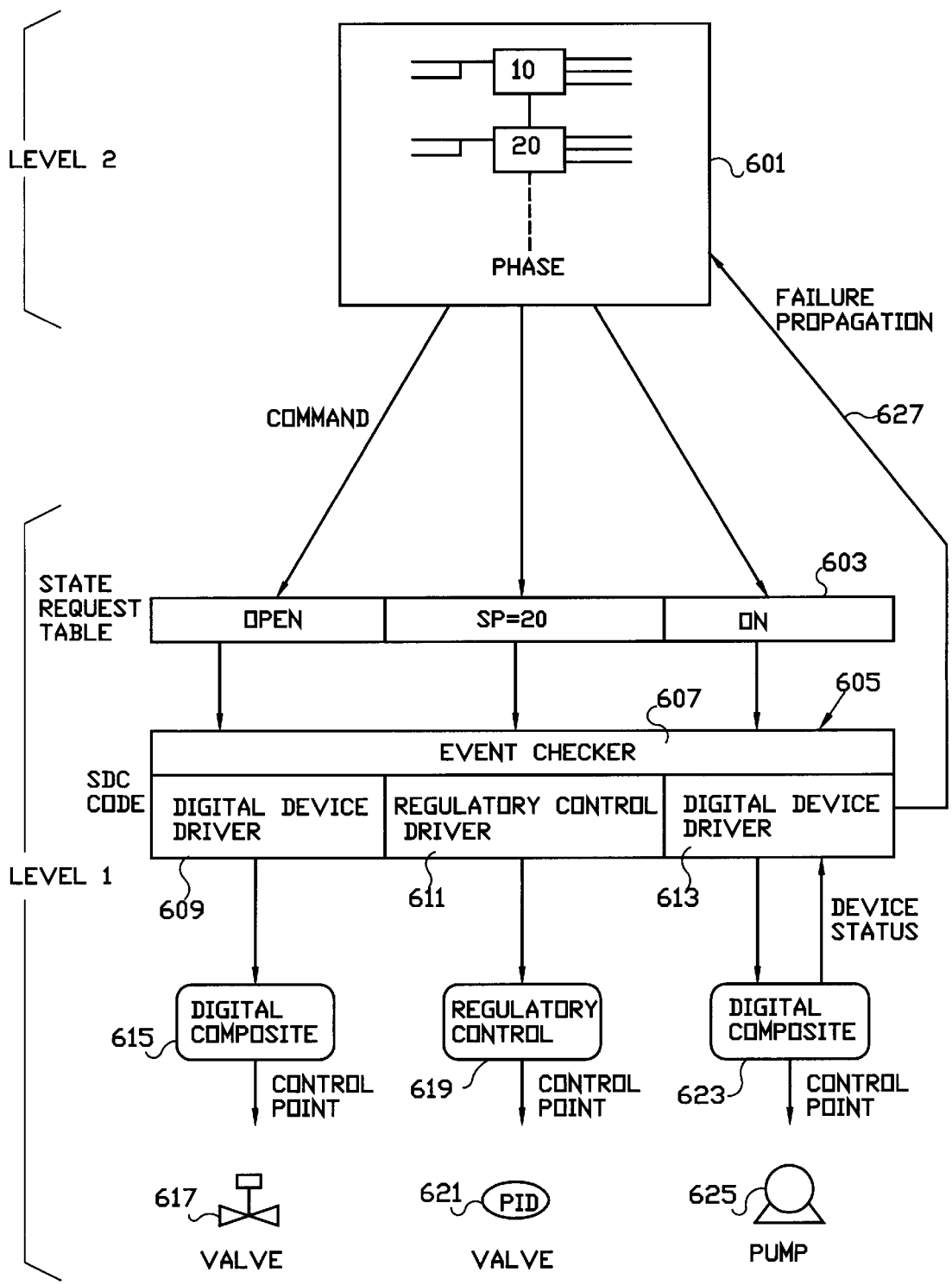
FIG. 4 is a block diagram depicting the phase-SDC communication according to the present invention.
Figure 5:
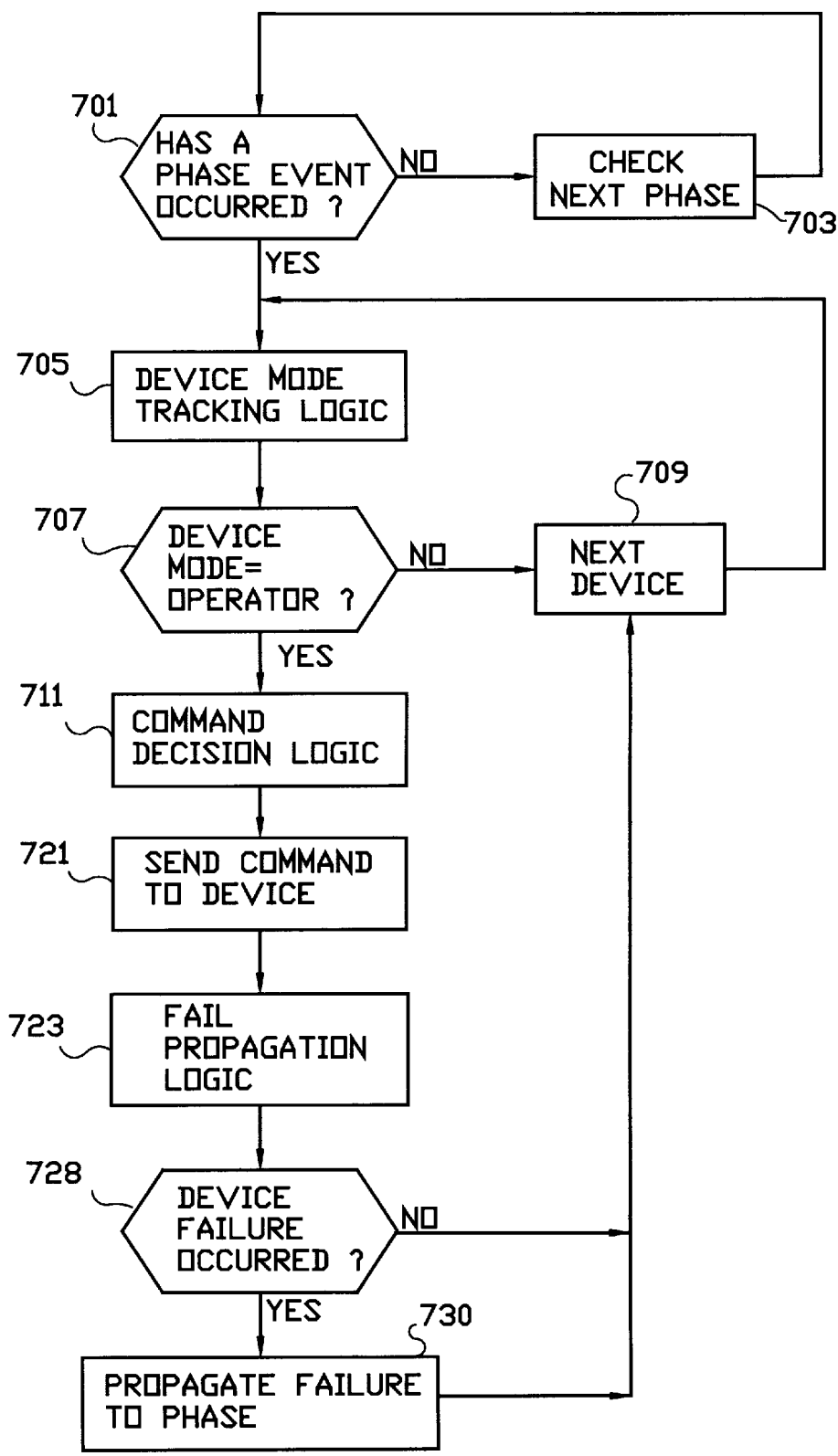
FIG. 5 is a operation flowchart of the smart device control according to the present invention.
Figure 6:
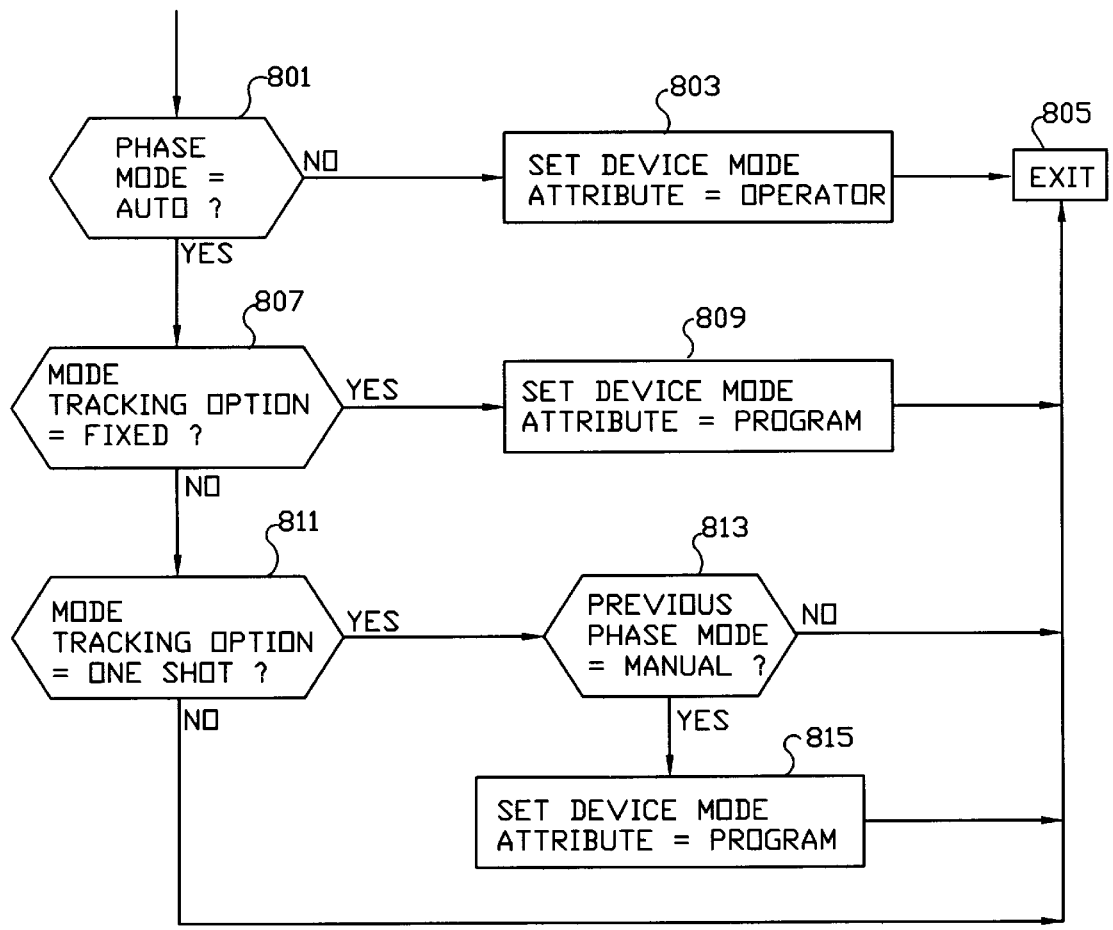
FIG. 6 is the device mode tracking logic diagram.
Figures 7, 8:
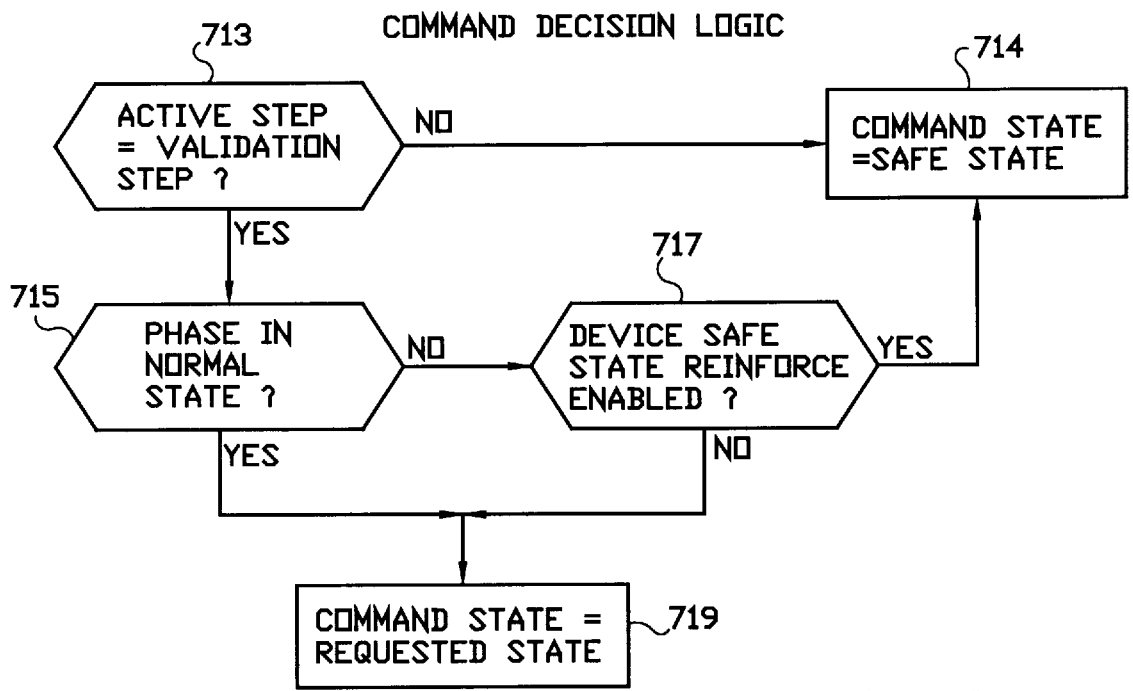
FIG. 7 is a representative schematic of the State Request Table.
FIG. 8 is the smart device control command decision logic diagram.
Figure 9:
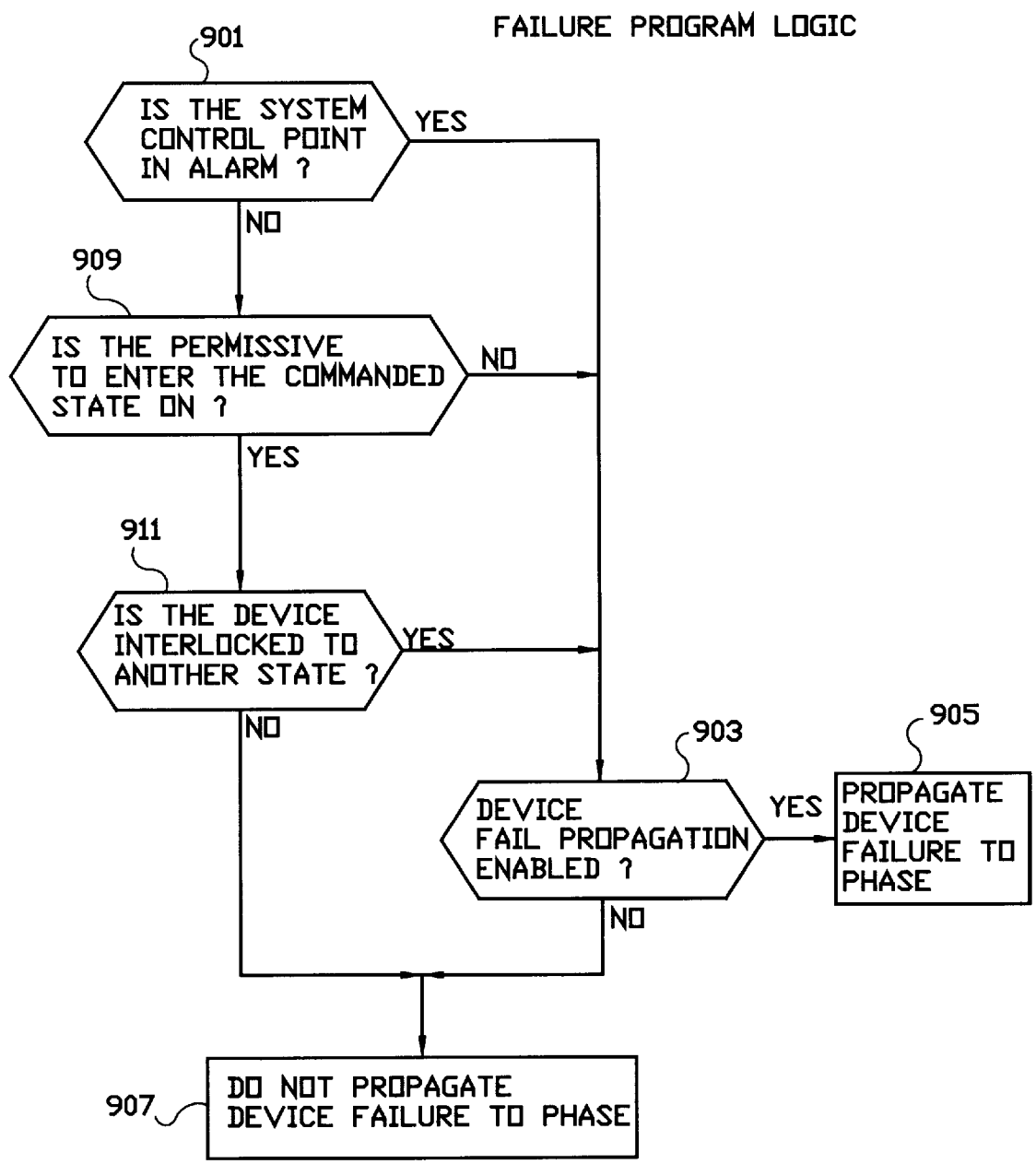
FIG. 9 is the smart device control failure program logic.

FIGS. 4–9 depict the unique phase and SDC communications overview according to the present invention, wherein FIG. 4 depicts a phase 601 which transmits a command to a State Request Table 601. As shown in FIG. 7, state request table 603 can have, for example, a commanded state "closed", a requested state "open", a validation step "20" and a current step "20". State request table 603 then transmits the commanded or requested state and steps to SDC code 605. SDC code includes an event checker 607, digital device driver 609, regulatory control driver 611 and digital device driver 613. Digital device driver 609 transmits a signal to digital composite control point 615 for activating or deactivating a device 617 such as a valve. Regulatory control driver transmits a signal to regulatory control point 619 which controls a device 621. Finally, digital device driver 613 transmits a signal to digital composite control point 623 to activate or deactivate a device 625 such as a pump. Digital composite 623 also transmits back to digital device driver 613 the status of device 625. Finally, SDC code 605 shares some data (phase failure flag and status numeric) from the same global point with phase 601 via transmission line 627. In summary, phase 601 sets and pushes the state request to SDC 605, while SDC fetches the data (step, mode, etc.) from phase 601.

FIG. 5 is a flowchart depicting the operation of the SDC, wherein the program initially seeks to determine whether or not a phase event has occurred 701. If no phase event has occurred, then the SDC checks the next phase 701 and returns to 701. If a phase event has occurred, then the device mode tracking logic 705 from FIG. 6 is activated.

The device mode tracking logic as shown in FIG. 6 initially seeks to determine whether the phase mode is "auto" 801. If no, the device mode attribute is set to "operator" 803 and exits device mode tracking logic 805. If phase mode is on "auto", then it seeks to determine if mode tracking option equals "fixed" 807. If yes, then the device mode attribute is set to "program" 809 and then exits 805. If no, then is seeks to determine is the mode tracking option equals "one shot" 811. If no it exits 805. If yes, it seeks to determine if the previous phase mode equals "manual" 813. If no it exits 805. If yes, it sets the device mode attribute to "program" 815 before exiting 805. If the mode tracking option does not equal "one shot", then it exits 805.

If the device mode equal operator 707, then the SDC switches to the next device 709 and returns to 705. If device mode does not equal operator, then the command logic 711 from FIG. 8 is activated.

The command decision logic in FIG. 8 seeks to determine whether active step equals validation step 713. If not, then command state is a "safe state" 714. If the active step equals validation, then the SDC seeks to determine whether the phase is in a normal state 715. If not, then the SDC determines whether the device safe state reinforce is enabled 717. If so, then the command state is a "safe state" 714. If the phase is in a normal state or if the device safe state reinforce is enabled, then the command state is "requested state" 719.

After command decision logic step 711, the SDC program flowchart 711 sends a command to a device 721. Then the SDC program checks the failure propagation logic 723 as set forth in FIG. 9. The failure propagation logic initially seeks to determine if the system control point in alarm 901. If yes, then is seeks to determine if the device fail propagation is enabled 903. If the device fail propagation is enabled then the system propagates the device failure to the phase 905. If it is not enabled, then it does not propagate device failure to the phase 907.

If the system control point is not in alarm, then the system seeks to determine if the permissive to enter the commanded state "on" 909. If no, then it goes to step 903. If yes, then the system seeks to determine if the device is interlocked to another state 911. If yes, then it goes to step 903. If no, then is does not propagate device failure to the phase 907.

After the execution of the failure propagation logic 723, the SDC program seeks to determine if the any device failure has occurred 725. If no, then the SDC program checks the next device 709. If yes, it will propagate failure to the phase 730 before checking the next device 709.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A system for building discrete phase sequential steps, which constitute a phase responsible for a discrete task, said system comprising:

a means for creating graphical sequences;

a phase controller code means for converting said graphical sequences into said phase sequential steps;

a smart device control code means for converting said graphical sequences into at least one smart device control code in accordance with said phase sequential steps; and a controller means coupled to said phase controller code means and said smart device control code means for compiling and generating a phase object and a smart device control object for controlling at least one input/output device to perform said discrete task.

2. The system according to claim 1, further comprising:

means for creating or opening a project;

means for generating at least one phase controller code or adding or editing said phase, said at least one smart device control code, a box, or an equipment list;

means for adding or editing header data;

means for adding or editing either a normal step, a branch step or a message step;

means for detecting whether any new inputs have been received from said at least one input/output device;

means for sending outputs to said at least one input/output device; and means for closing said project.

3. The system according to claim 1, wherein said smart device control code means provides for: device request and activation, input/output device mode propagation; input/ output device safe state enable/disable; and input/output device fail enable/disable.

4. The system according to claim 1, further comprising:
a microprocessor for running said phase object and said smart device control object; and
an I/O communication processor for communicating inputs and outputs between said microprocessor and said at least one input/output device.

5. The system according to claim 4, wherein said smart device control code means communicates with said I/O communication processor for activating or deactivating said at least one input/output device.

6. The system according to claim 1, wherein said controller means further comprises a means for loading said phase object and said smart device control object into a run time.

7. The system according to claim 1, wherein said smart device control code means further comprises:
means for determining whether a phase event has occurred;
a means for activating a device mode tracking logic program;
a means for activating a command decision logic program;
a means for sending a command to said at least one input/output device;
a means for activating a failure propagation logic program;
a means for determining whether a failure has occurred in said at least one input/output device; and
a means for propagating said failure to said phase.

8. A storage media for a system for building discrete phase sequential steps, which constitute a phase responsible for a discrete task, said storage media:
controlling a processor to create graphical sequences;
controlling a processor for a phase controller code means, to convert said graphical sequences into said phase sequential steps;
controlling a processor for a smart device control code means, to convert said graphical sequences into at least one smart device control code in accordance with said phase sequential steps; and
controlling a processor for a controller means coupled to said phase controller code means and said smart device control code means, to compile and generate a phase object and a smart device control object for controlling at least one input/output device to perform said discrete task.

9. The storage media according to claim 8, further comprising:
means for creating or opening a project;
means for generating at least one phase controller code or adding or editing said phase, said at least one smart device control code, a box, or an equipment list;
means for adding or editing header data;
means for adding or editing either a normal step, a branch step or a message step;
means for detecting whether any new inputs have been received from said at least one input/output device;
means for sending outputs to said at least one input/output device; and
means for closing said project.

10. The storage media according to claim 8, wherein said smart device control code means provides for: device request and activation, input/output device mode propagation; input/output device safe state enable/disable; and input/output device fail enable/disable.

11. The storage media according to claim 8, further comprising:
a microprocessor for running said phase object and said smart device control object; and
an I/O communication processor for communicating inputs and outputs between said microprocessor and said at least one input/output device.

12. The storage media according to claim 11, wherein said smart device control code means communicates with said I/O communication processor for activating or deactivating said at least one input/output device.

13. The storage media according to claim 8 wherein said controller means further comprises a means for loading said phase object and said smart device control object into a run time.

14. The storage media according to claim 8, wherein said smart device control code means further comprises:
a means for determining whether a phase event has occurred;
a means for activating a device mode tracking logic program,
a means for activating a command decision logic program;
a means for sending a command to said at least one input/output device;
a means for activating a failure propagation logic program;
a means for determining whether a failure has occurred in said at least one input/output device; and
a means for propagating said failure to said phase.

15. A process for building discrete phase sequential steps, which constitute a phase responsible for a discrete task, said process comprising the steps of:
creating graphical sequences;
converting said graphical sequences into said phase sequential steps;
converting said graphical sequences into at least one smart device control code in accordance with said phase sequential steps; and
compiling and generating a phase object and a smart device control object for controlling at least one input/output device to perform said discrete task.

16. The process according to claim 15, further comprising the steps of:
creating or opening a project;
generating at least one phase controller code or adding or editing said phase, said at least one smart device control code, a box, or an equipment list;
adding or editing header data;
adding or editing either a normal step, a branch step or a message step;
detecting whether any new inputs have been received from said at least one input/output device;
sending outputs to said at least one input/output device; and
closing said project.

17. The process according to claim 15, further comprising the step of providing for the following: device request and activation, input/output device mode propagation; input/output device safe state enable/disable; and input/output device fail enable/disable.

18. The process according to claim 15, further comprising:
   running said phase object and said smart device control object; and
   communicating inputs and outputs of said phase sequential steps to said at least one input/output device.

19. The process according to claim 18, further comprising the step of activating or deactivating said at least one input/output device.

20. The process according to claim 15 further comprising the step of loading said phase object and said smart device control object into a run time.

21. The process according to claim 15, further comprising the steps of:
   determinig whether a phase event has occurred;
   activating a device mode tracking logic program;
   activating a command decision logic program;
   sending a command to said device;
   activating a failure propagation logic program;
   determining whether a failure has occurred in said device; and
   propagating the failure to said phase.

* * * * *